Sept. 26, 1961     W. B. McLEAN ET AL     3,001,474
PROPELLANT SERVO AND POWER SUPPLY FOR MISSILE GUIDANCE
Filed Jan. 18, 1954     2 Sheets-Sheet 2

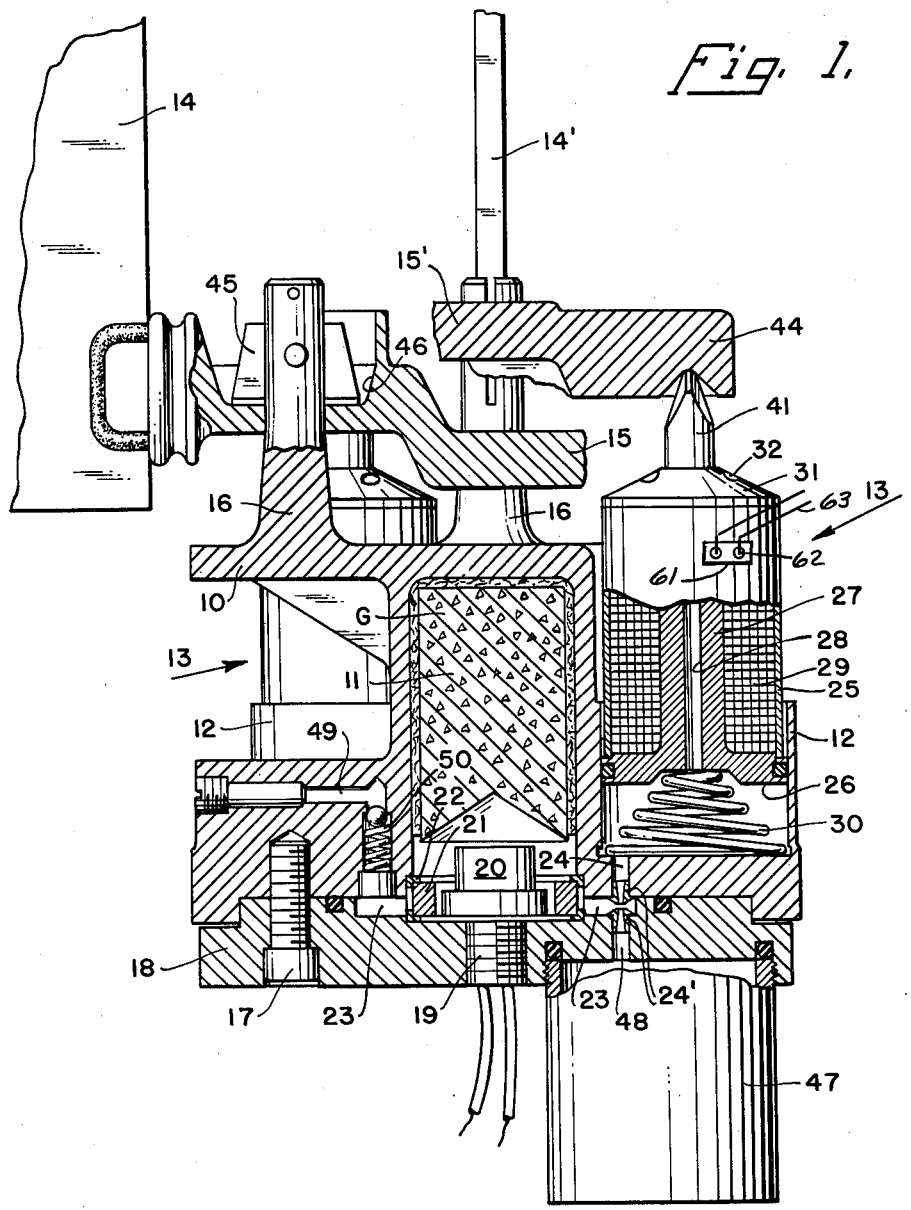

INVENTORS
WILLIAM B. MCLEAN
SYDNEY R. CROCKETT
HOWARD MONTANK
MICHAEL KAMIMOTO
BY
ATTORNEYS

United States Patent Office 3,001,474
Patented Sept. 26, 1961

3,001,474
PROPELLANT SERVO AND POWER SUPPLY FOR MISSILE GUIDANCE
William B. McLean, 510 Lexington, and Sydney R. Crockett, 107A Mitscher, both of China Lake, Calif., Howard A. Montank, Los Angeles, Calif. (6043 Fulton, Van Nuys, Calif.), and Michael Kamimoto, 306A McIntyre, China Lake, Calif.
Filed Jan. 18, 1954, Ser. No. 404,814
18 Claims. (Cl. 102—50)
(Granted under Title 35, U.S. Code (1952), sec. 266)

The invention described herein may be manufactured and used by or for the Government of the United States of America for governmental purposes without the payment of any royalties thereon or therefor.

The present invention relates to servo mechanisms of the type wherein electrical control signals or impulses are translated into appropriate mechanical forces and to controls for such servo mechanisms. The invention is more particularly directed to servo mechanisms of the type wherein stability, light weight, and high torque output are essential and especially necessary. A particular application of the invention is in connection with the operating of the control surfaces of a guided missile or homing rocket of the kind wherein guidance is in response to electrical signals initiated by a radiant energy responsive device or other similar seeking or tracking mechanism.

In the prior art, various servo systems are known in which electrical signal impulses operate valves or the like to control hydraulic pressure which in turn actuates pistons to produce mechanical motion whereby to develop a torque proportional to the control system feedback as needed. These prior art systems, however, present a number of serious shortcomings which render them unsuitable for the particular applications referred to above. For example, the previous systems involve complex mechanisms requiring a high degree of precision in their manufacture which features are neither appropriate nor desirable for expendable armament applications. Furthermore, systems known to the prior art are, in general, of the type wherein the mechanical movement, for example missile control surface deflection, produced by the servo mechanism is proportional to the control signal; that is, the torque output of these systems is not constant for a given control signal but rather varies in accordance with the opposing torque exerted on the control surfaces by the airstream whereby to maintain a fixed control surface position for a given control signal. This characteristic constitutes one of the foremost disadvantages of the known servo systems insofar as their adaptability for use in missile guidance systems is concerned. Thus, present day missiles are intended to be guided along circuitous flight paths and to be operated between wide altitude limits, and hence through excessive ambient temperature and atmospheric pressure ranges, with the result that for a given control signal, the control surface deflection necessary to maintain the missile on a given flight path varies along the length of the path. For example, the decrease in the forces exerted on a missile's fins by the air stream, owing to a decrease in air density or airspeed, as where the missile is guided along an ascending flight path, must be compensated for by an increase in fin deflection if flight along the given path is to be maintained. Such variations in fin deflection must, in applications employing prior servo systems, be effected by changes in the control signal. It will be apparent, therefore, that a system producing a torque proportional to a given control signal will result in the proper operation of the missile over a wider range of the variables of air speed and air density than can be achieved with a servo producing a fin displacement proportional to the control signal.

One of the significant features of the present invention is that control surface deflection produced by the servo mechanism is not proportional to the electrical control signal, but rather the arrangement is such that for a given control signal a torque is produced which remains constant regardless of control surface position; that is, for any given control signal, the arrangement provides a force balance system wherein upon a change in the torque exerted on the control surfaces by the airstream, owing to some effect such as change in air density or air speed or the like, the deflection of the fins automatically adjusts to a new value wherein the force or torque exerted thereon by the airstream is balanced against the torque produced by the servo mechanism without any change in the control signal. It is this feature of the present servo mechanism, namely, that the fins automatically assume a new position wherein the torque thereon is balanced against the torque created by the servo mechanism, without change in the control signal, that constitutes a primary advantage of the present invention and one which adapts it for the particular applications in which it is intended to be used.

The servo system of this invention is pneumatically or gas actuated and the driving fluid may be produced by a slow burning propellant. The arrangement of the system is such that propellant fluid is bled from the burning chamber into the piston chambers of the servo mechanism wherein the greatest attainable pressure is less than the critical flow pressure, that is, in general, less than one-half of that in the burning chamber, whereby burning chamber pressure is unaffected by variations in piston chamber pressures. Since the pressure in the piston chambers does not affect the pressure in the burning chamber the propellant is able to burn at substantially a constant rate and supply fluid to each of the piston chambers at substantially constant flow rate.

Electrical power for this servo system is preferably provided by a gas driven generator receiving motivating fluid from the burning propellant. The system is thus completely self-contained.

In accordance with the foregoing, one of the primary objects of the present invention is to provide an improved servo mechanism having the characteristics of high stability, light weight, and high controlled torque output.

A further object of the invention is to provide a servo mechanism as described, wherein the torque or force developed by the servo mechanism is independent of the actual displacement of the element actuated by the servo mechanism, i.e., wherein a balance is produced, as between a torque developed by the servo mechanism and the external torque acting on the actuated element, in response to the magnitude of the control signal but independent of the position of the actuated element.

Still a further object of the invention is the provision of a servo mechanism, for actuating the fins of a guided missile, wherein for a given control signal from the signal initiating means, the torque applied to the fins remains constant irrespective of fin deflection whereby the position of the fins will be automatically adjusted to maintain a balance between the torque exerted on the fins by the air stream and the torque applied to the fins by the servo mechanism, the fin position being adjusted until this balance is achieved.

A further object of the invention is to provide a missile guidance servo mechanism as in the foregoing wherein there is provided a piston chamber having a missile fin actuating piston therein, the pressure in the chamber being controlled by an electromagentically operated valve which is positioned jointly in response to an electrical control signal and the actual pressure in the piston chamber, the valve being so positioned that the chamber pressure is a function of the control signal.

Another object of the invention is to provide a servo mechanism involving a piston and a piston chamber and having an electromagnetically operated control valve device, the device including an armature controlling a valve and so arranged that the position of the armature is dependent upon the gas pressure under the valve as well as upon the electromagnetic force on the armature.

A further object of the invention is to provide a servo mechanism wherein the motive fluid is provided by a slow burning propellant burning at a constant rate and valves capable of controlling the flow of the hot corrosive gas generated to a high degree of accuracy without failure.

Another object is to provide a servo mechanism, as in the foregoing, which is simple in construction and which requires a minimum of precision in its manufacture whereby to render it particularly suitable for use in missile guidance systems.

Further objects and numerous of the advantages of the invention will become apparent from the following detailed description and annexed drawings wherein:

FIG. 1 is a sectional view, taken along line 1—1 of FIG. 3 of an assembly constituting a preferred form of the present invention and includes a schematic showing of electrical circuitry for feeding signal information to the assembly.

Figure 3:
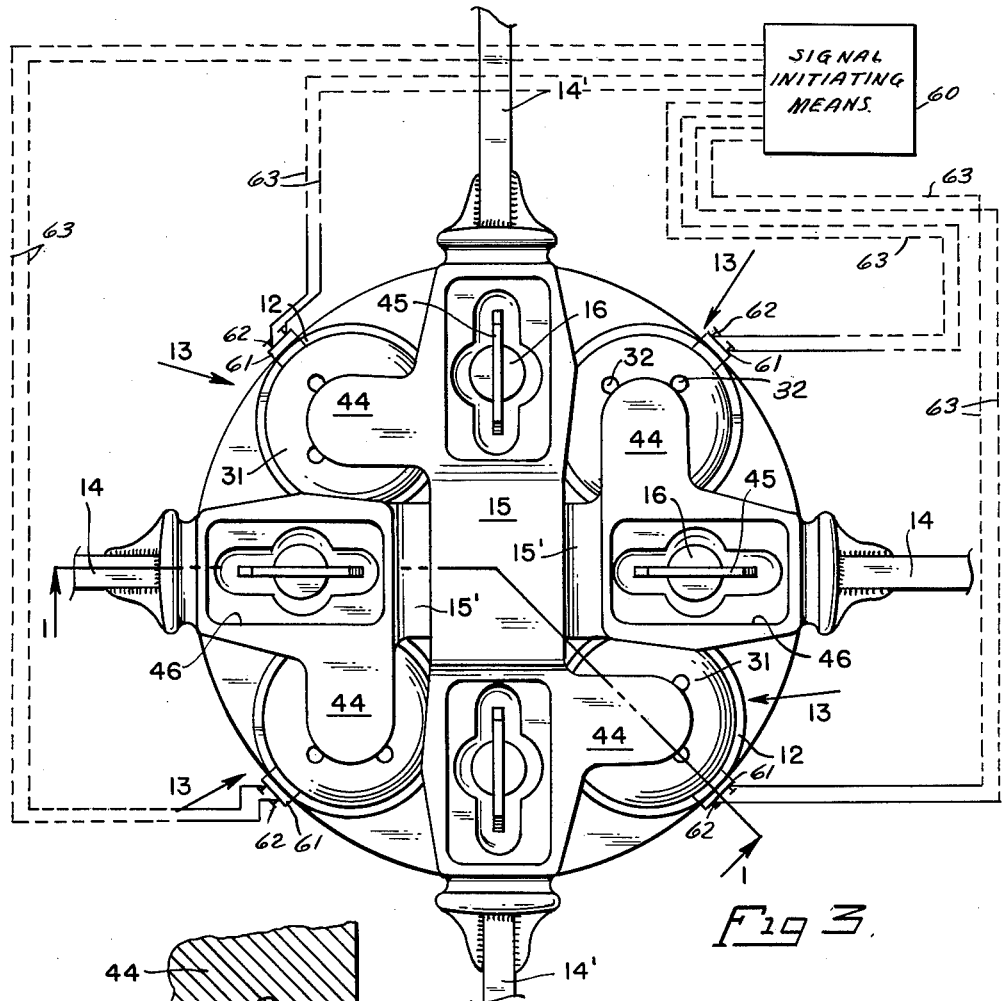
FIG. 3 is a plan view of the present invention.

FIG. 1 illustrates a unit or assembly comprising the servo mechanism of the present invention and the fins or control surfaces which are actuated thereby. The unit or assembly of FIG. 1 may be mounted in or as part of a missile. The radiant energy responsive control or signal initiating system of the missile is illustrated only diagrammatically, as at 60, the details thereof not being shown since it in itself is not part of this invention, generates electrical signals in accordance with its incoming control signal, which may be either radiated from a remote source, such as the target or a remote control station, or reflected from the target, which electrical signals serve to control a group of electromagnetically operated valves embraced within the assembly which function to establish the torque applied to the fins, as will be described. In FIG. 1, numeral 10 designates the body or chassis of the assembly which is in the form of a structural component having a central cylindrical bore opening through the lower end of the body 10 and forming a propellant chamber 11. In the component 10, and equiangularly disposed around chamber 11, are a group of four cylinders or piston chambers 12 (see FIG. 3) having their bores parallel to the bore of chamber 11. Disposed within each of the cylinders 12 is a piston assembly, one of which is shown in cross section at 13 in FIG. 1, opposed pairs of which function conjointly and in opposition to each other to actuate the sets of missile control surfaces or fins 14 and 14' through suitable link members 15 and 15' fulcrumed on upstanding portions 16 formed on body 10 as will be later described. Removably attached, as by screws 17, to the lower part of component 10, whereby to permit insertion of a propellant grain into chamber 11, is a circular plate member 18 having an annular shoulder interfitting with a similar shoulder on member 10 as shown. At its center, member 18 carries a screw threaded plug member 19 which supports a firing squib 20 for igniting a propellant grain G disposed in chamber 11. Appropriate electrical leads extend through plug 19 for igniting the squib. Surrounding squib 20 and radially spaced therefrom is an annular filter member 21, which serves to remove solid particles from the gases generated by the burning propellant and which is supported by a pair of flanged ring members 22 clamped between annular shoulders formed in the member 18 and in the structural component 10 as shown. Gas generated by the burning propellant in chamber 11 passes through the filter member into an annular channel 23, formed by the end surface of component 10 and an annular recess in plate 18, and thence through passages 24 formed in the lower end wall of each piston chamber 12, and each having a metering orifice insert 24' therein, into the interior of the piston chambers. Metering orifices 24' are designed to withdraw gas from the center of passage 23 rather than from the walls thereof whereby to prevent plugging of the orifices by carbon particles which break away from the carbon deposits formed on the walls of passage 23 and move along the walls under the action of the gas stream. By withdrawing gas from the center of passage 23, the movement of the particles into the orifices 24', and hence plugging of the latter, is substantially eliminated.

Each of the piston assemblies 13 comprises an outer cylinder 25 slidably fitting within the chamber or cylinder 12 and having secured to the lower end thereof a closure member 26 formed with an upstanding central stem portion 27 as shown. The stem portion 27 has a central bore 28 extending axially therethrough, the bore 28 having a reduced end portion 28' (FIG. 2) forming an orifice through which gases may be bled from the space below the piston to the atmosphere as will be hereinafter described. Within cylinder 25 and encircling the upstanding stem portion 27 is an electromagnetic winding 29. Each of said cylinders 25 has terminal post support means 61 attached thereto, as by welding, providing support for terminals 62 which extend through the cylinder wall to make appropriate contact with the winding 29 for conducting current from signal initiating means 60 to the winding 29, as by lead wires 63. The piston assembly seats on a spiral biasing spring 30 disposed in the lower part of piston chamber 12.

Figure 2:
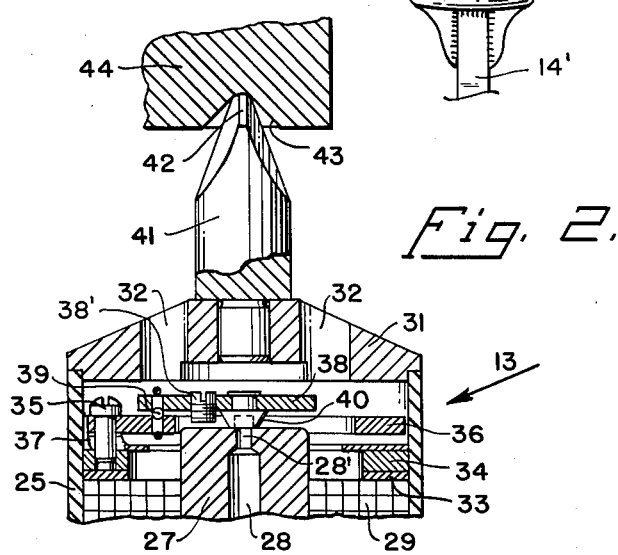
FIG. 2 is a sectional view of the upper portion of one of the actuating pistons of the servo mechanism showing the electromagnetic valve assembly.

Referring now to FIG. 2, wherein the upper portion of the piston assembly is shown in enlarged section, it will be seen that the upper end of cylinder 25 is closed by a cap 31 having apertures 32 therein whereby the gas bled through orifice 28' may pass to atmosphere. The control valve assembly for controlling the escape of gas through orifice 28', and as a result the movement of the piston assembly 13, comprises a pair of annular members 33 and 34 encircling stem 27 and disposed on the upper end of winding 29 and to the latter of which members is secured, as by a screw 35, an annular plate 36 which is retained in spaced relation to member 34 by an adjusting spring member 37. An armature 38 is pivotally mounted on plate 36, as by way of a hinge 39, whereby it may move toward or away from the upstanding stem portion 27. Secured to armature 38 and in coaxial relationship with stem 27 is an inverted cup shaped member 40, internally recessed as shown, forming a valve which is adapted to regulate the escape of gas through orifice 28' by movement toward and away from the open end thereof. The position of the armature 38, and hence of valve 40, relative to the stem 27 is determined jointly by the magnetic flux produced by the winding 29, which in turn is controlled by a signal initiated by the seeker mechanism or signal initiating means, and the gas pressure acting on valve 40. Thus, from FIG. 2, it can be seen that the gas passing upwardly through bore 28 exerts a pressure against valve or cup member 40 which is balanced by the downward electromagnetic force acting on armature 38. It will be appreciated that owing to the fact that operation of the instant servo mechanism is dependent upon the balancing of an electromagnetic force on the armatures 38 against a force resulting from the pressure of the operating gas acting on the cup-shaped valve members 40, rather than being dependent upon the flow of gas past the valve members 40, accumulations of carbon deposits about the rims of valve members 40 will not adversely affect the operation of the servo. Thus, the present servo system will function satisfactorily with a hot fluid which tends to create such solid accumulations of carbon on all surfaces as well as with a "clean" operating fluid. A soft iron adjustment screw 38' may be provided on the armature if desired to permit variation of the magnetic impedance of the air gap so as to establish the proper relation between control signal and cylinder pressure. As normally operated, the maximum current in each valve will not cause the pressure in the cylinders to exceed one-half of the pressure in the propellant burning chamber. This condition is desirable but not necessary in order that the flow rate of the gas through the orifices 24' will always be independent of the pressures in the cylinders and thus maintain a uniform propellant burning rate.

Extending from cap 31, and concentrically arranged with respect to cylinder 25, is a pin 41, having a bevelled end as shown and a semicylindrical end surface 42 which engages in a substantially conical recess 43 provided in a projecting lever arm 44 formed on the link members. Referring to FIG. 3, it will be noted that link members 15 and 15' each have a pair of projecting lever arms 44 extending from opposite sides thereof with the lever arms of each link member overlying diametrically opposed pistons 13, each arm having a recess 43 formed therein for receiving the pin 41 on its respective piston. Fixed in a slot in each of the upstanding portions 16 of component 10 is a fulcrum plate 45 having its lower edge pivotally engaging in the bottom of recesses 46 formed in each of the link members 15 and 15', as shown, whereby to provide for pivotal movement of said link members about axes at right angles to each other and to the longitudinal axis of piston assemblies 13. Fins 14 and 14' are attached, as by welding, to opposite ends of the link members 15 and 15' whereby pivotal movement of said link members will effect deflection of the fins for steering the missile.

From the description thus far it will be apparent that the piston assemblies 13 operate in pairs to actuate the missile fins 14 and 14'. Thus, one of the diametrically opposed pistons associated with link member 15 acts to cause pivotal movement of link member 15, and therefore fins 14, in one direction, while the other of said diametrically opposed piston assemblies associated with link member 15 acts in opposition to said one piston to cause pivotal movement of link member 15, and therefore fins 14, in the opposite direction. The same is true of fins 14', link member 15' and the pistons associated therewith. The electromagnetic windings in the opposed pairs of pistons are similarly but oppositely controlled by the signal initiated by the seeking or tracking mechanism; that is when the current in the electromagnetic winding of one of the pistons of a pair of opposed pistons is decreased owing to a change in the incoming signal from the signal initiating means, the current in the other piston of said pair of opposed pistons is increased by the same amount so that the pairs of opposed pistons act differentially to control the deflection of fins 14 and 14'.

A gas operated generator 47 is threadedly secured to circular plate 18, as shown, and is communicated with propellant chamber 11 through an orifice 48 extending through plate 18 into annular passage 23 whereby propellant fluid may flow from chamber 11 to generator 47 whereby to operate the latter. Generator 47 serves to provide the operating current and for the electromagnetic windings 29. A passage 49, communicating with propellant chamber 11 and having mounted therein a check valve assembly 50, may be provided if desired for testing the operation of the servo mechanism, as by connecting passage 49 to a fluid pressure source, prior to launching of the missile.

The operation of the present servo system is as follows. Upon launching of the missile, squib 20 is ignited thereby causing combustion of the propellant grain G within chamber 11. The gases generated by the burning of the propellant grain flow through filter member 21 into annular passage 23 and thence through metering orifices 24' into each of the cylinders 12 whereupon the gases will act on the ends of pistons 13 causing the same to be moved to an extended position. Assuming the missile to be directed along a straight flight path, equal currents will be supplied to windings 29, and valves 40 will be displaced a distance from stems 27 whereby the cylinder pressures and hence the forces acting on the pistons will be equal, and owing to the conjoint and opposing action of opposed pistons the forces acting on one piston of each pair of opposed pistons will be balanced by the force acting on the other piston of that pair of opposed pistons whereby fins 14 and 14' will be moved to such a position that they will exert no torque on the servo system. Upon a change in the control signal initiated by the signal initiating means 60, that is, a change in the target signal in a homing type missile, for example, the current in the winding 29 of one piston of a pair of opposed pistons, or in one piston of each pair of opposed pistons, depending upon whether the missile heading is to be changed in azimuth or elevation or both, will be increased or decreased in accordance with the change in the said signal and the current in the winding 29 of the other piston of the pair of opposed pistons or the other pistons in each of the pair of opposed pistons will be similarly but oppositely decreased or increased in the manner heretofore described. Upon the increase in the current in one piston of one pair of opposed pistons, the electromagnetic force acting on armature 38 in that piston will be increased and the armature caused to move toward stem 27 of that piston with the result that the escape of propellant fluid through orifice 28' is reduced and the pressure below the piston is increased, and simultaneously the current in the winding of the other piston of that pair of opposed pistons will be decreased, the electromagnetic force acting on armature 38 in that piston reduced, and therefore that armature will, under the force of pressure fluid in that piston, be moved away from stem 27 thereby reducing the force on that piston, this action continuing until a new balance is achieved. Thus, the force on one of said opposed pistons is increased while the force on the other of said opposed pistons is correspondingly decreased thereby causing a deflection of the respective fins to a point wherein a new force balance is established between the force differential of the opposed pistons and the force of the air stream on the fins. It will be seen that for a given difference of currents in windings 29 of a pair of opposed pistons, the torque output of that pair of pistons will remain constant regardless of fin position since the pressure in each piston cylinder, and hence the force differential, is determined by the electromagnetic force acting on the armature in that piston, which electromagnetic force is constant for given currents. Thus, if during any period of fixed currents flowing through the windings 29 of the pistons, the forces exerted on the missile fins should vary owing to a change in the conditions heretofore described, it will be readily seen that the fins will be caused to be deflected until a force balance is established between the torque created by the air stream and the torque created by the servo mechanism, the latter being constant, regardless of fin position, for a given difference of currents in opposed pistons. Thus, the deflection of the fins is automatically adjusted to a new position wherein the torque necessary to maintain the missile on a given flight path is achieved without any change in the control signal.

From the above it will be apparent that the present invention provides a servo mechanism which incorporates relatively few and inexpensive components, necessitates a minimum amount of precision in its manufacture, which is easily assembled and tested, and which, for a given control signal from the seeker mechanism, provides for a high constant torque output regardless of variations in the position of the control surface or other element operated thereby.

Obviously, many modifications of the present inven-

What is claimed is:

1. A steering apparatus for bodies propelled through a fluid comprising a control surface having a pivoted actuating lever attached thereto, a pair of fluid operated means operatively connected to said lever for pivotally moving said surface in opposite directions, said means opposing each other in operation whereby the amount and direction of the torque applied to said lever is determined by the pressure differential existing between said means, a pressure fluid supply connected to each of said means, and electromagnetically operated valve means associated with each of said fluid operated means for bleeding pressure fluid therefrom to atmosphere whereby said pressure differential and hence control surface torque may be varied by a change in the current to said valve means.

2. Apparatus according to claim 1 wherein electromagnetic force acts to move said valve means toward a closed position against the pressure of the fluid in said fluid operated means so that for a given value of current to said valve means the torque applied to the control surface will remain constant whereby the position of said surface will be automatically adjusted to maintain constant the torque exerted thereon by the fluid through which body is propelled without any change in the control current.

3. Apparatus according to claim 1 wherein each of said fluid operated means comprises a cylinder and piston movable therein.

4. Apparatus according to claim 3 wherein each of said valve means comprises a valve member pivotally mounted on said piston and an electromagnetic winding within said piston.

5. A steering apparatus according to claim 3 wherein said fluid pressure supply comprises a chamber, a relatively slow burning propellant in said chamber, said chamber being communicated by orifices to the interior of said cylinders, said valve means acting to limit the maximum pressure in said cylinders to less than the critical flow pressure for said orifices whereby the propellant will burn at substantially constant pressure regardless of variations in cylinder pressure.

6. A steering apparatus for a guided missile comprising a signal initiating means, a steering fin, means operatively engaging said fin for moving it in opposite directions, said means including a pair of piston and cylinder assemblies acting in opposition to each other, a pressure fluid supply connected to said cylinders and electromagnetically operated pressure fluid bleed valve means opening to atmosphere associated with each of said cylinders adapted to receive current from said signal initiating means and movable toward a closed position against the pressure of the fluid in said cylinders by current supplied to said valve means, the arrangement being such that the position of the fin is automatically adjusted to maintain the application of a constant torque thereto by the air stream without any change in control current.

7. A steering apparatus for a guided missile comprising a signal initiating means, a first pair of connected pivotable fins disposed at diametrically opposite sides of the missile, a second pair of connected pivotable fins disposed at diametrically opposite sides of the missile and being angularly spaced substantially 90° from the first pair of fins, a pair of fluid operated means operatively engaged with each pair of fins for moving the respective pair of fins in opposite directions, the fluid operated means of each pair opposing each other in operation whereby the amount and direction of the torque applied to each pair of fins will be determined by the pressure differential existing between the fluid operated means associated with that pair of fins, a pressure fluid supply communicated with each of said fluid operated means, valve means associated with each of said fluid operated means for bleeding pressure fluid therefrom to atmosphere whereby said pressure differential and hence fin torque is determined by the positions of said valve members, and electromagnetic windings associated with each of said valve members adapted to receive control current from the signal initiating means for controlling the positions of said valve members.

8. Apparatus according to claim 7 wherein the electromagnetic force created by each of said windings acts to move the associated valve member toward a closed position against the pressure of the fluid in the corresponding fluid operated means whereby for given currents in said windings the torque applied to each of said pairs of fins will remain constant and the positions of the pairs of fins will be automatically adjusted to compensate for variation in the torque exerted thereon by the air stream owing to changes in air speed or atmospheric conditions without any change in control current.

9. Apparatus according to claim 7 wherein each of said fluid operated means comprises a cylinder and a piston movable therein, said supply being communicated with each of said cylinders.

10. Apparatus according to claim 9 wherein each of said valve members is mounted on its respective piston and each of said windings is contained within its respective piston.

11. Apparatus according to claim 9 wherein said supply comprises a chamber and a relatively slow burning propellant in said chamber, said chamber being communicated with each of said cylinders by an orifice, said valve members acting to limit the maximum pressure in said cylinders to less than the critical flow pressure of said orifice whereby said propellant will burn at substantially constant pressure regardless of variations in cylinder pressure.

12. A steering apparatus for a guided missile comprising a signal initiating means, a steering fin, a pair of fluid operated means operatively engaging said fin and acting in opposition to each other for moving the fin in opposite directions, electromagnetically operated valve means associated with each of said fluid operated means and adapted to receive control current from the signal initiating means to differentially operate said valves for differentially bleeding pressure fluid from said fluid operated means whereby to vary the pressure differential therebetween and control fin movement, a fluid operated electric generator for supplying operating current for the electromagnetic means for operating said valve means, and a pressure fluid supply communicated with said fluid operated means and said generator, said valve means opening to separate disconnected outlets whereby the pressure fluids bled from one of said pair of fluid operated means is not effective to increase the pressure of the other said fluid operated means or the amount of pressure fluid available thereto.

13. Apparatus according to claim 12 wherein said supply comprises a chamber and a relatively slow burning propellant in said chamber.

14. A force balance control system comprising a pivotally mounted member, a pair of fluid operated means operatively engaging said member and acting in opposition to each other for moving said member in opposite directions about it pivotal mounting, a pressure fluid supply connected to said means, each of said fluid operated means having a port communicating its interior to atmosphere, and electromagnetically operated valve means associated with each of said fluid operated means for regulating the escape of fluid from the interior of said fluid operated means to atmosphere through said ports and movable toward a closed position against the pressure of the fluid therein by the application of current to said valve means, the arrangement being such that for a given value of current to said pair of valve means the pressure differential between said fluid operated means and hence the torque output of the system remains constant regardless of the position of said pivotal member.

15. A system as in claim 14 wherein each of said fluid operated means comprises a cylinder and piston movable therein.

16. A system as in claim 15 wherein each cylinder has a port open to atmosphere and each piston has a passage therethrough, and each of said valve means comprises a valve member mounted on said piston to regulate the flow of fluid through said passage and thus through said port, and an electromagnetic winding within said piston to control movement of said valve.

17. A system as in claim 14 wherein said supply comprises a chamber communicated with each of said cylinders through an orifice, a relatively slow burning propellant in said chamber, said valve means limiting maximum cylinder pressure to less than the critical flow pressure through said orifice whereby said propellant will burn at substantially constant pressure.

18. In a force balance control system, a pair of fluid operated members mounted to act in opposition to each other whereby the force output of the system is determined by the force differential of said fluid operated members, an electromagnetically operated valve associated with each of said members for regulating the escape of pressure fluid through a port communicating the interior of said associated fluid operated members to atmosphere, said valve members being positioned in response to the combined effect of electromagnetic force and the pressure of the fluid in their respective members whereby the force output of the system may be controlled by varying the current of said valves.

References Cited in the file of this patent

UNITED STATES PATENTS

| | | |
|---|---|---|
| 1,328,088 | Lutz | Jan. 13, 1920 |
| 2,100,445 | Le Bleu | Nov. 30, 1937 |
| 2,172,124 | Gilbert | Sept. 5, 1939 |
| 2,207,936 | Nardone | July 16, 1940 |
| 2,362,262 | French | Nov. 7, 1944 |
| 2,408,770 | Frische et al. | Oct. 8, 1946 |
| 2,414,898 | Rous | Jan. 28, 1947 |
| 2,416,097 | Hansen et al. | Feb. 18, 1947 |
| 2,497,032 | Millard | Feb. 7, 1950 |
| 2,666,177 | Brannin | Jan. 12, 1954 |
| 2,695,365 | McLean | Nov. 23, 1954 |

FOREIGN PATENTS

| | | |
|---|---|---|
| 441,053 | Great Britain | Jan. 6, 1936 |